United States Patent [19]
Smith

[11] 3,785,670
[45] Jan. 15, 1974

[54] SECURITY COUPLING

[76] Inventor: Robert M. Smith, 15 Oceanside Dr., Daly City, Calif. 94014

[22] Filed: July 29, 1971

[21] Appl. No.: 167,145

[52] U.S. Cl................ 280/79.1, 301/114, 301/117, 70/230, 70/34, 151/9
[51] Int. Cl........................................... B60b 35/14
[58] Field of Search................... 301/114, 119, 117; 287/189.36 F; 151/9; 70/229, 230, 34; 280/DIG. 4, 47.34; 16/30, 35, 45

[56] References Cited
UNITED STATES PATENTS

| | | | |
|---|---|---|---|
| 3,115,720 | 12/1963 | Lachance | 280/47.34 X |
| 542,330 | 7/1895 | Bryden | 301/114 X |
| 703,016 | 6/1902 | Tash | 301/119 |
| 3,208,493 | 9/1965 | Holmes | 151/9 X |
| 3,321,213 | 5/1967 | Shoffner | 280/47.34 |

FOREIGN PATENTS OR APPLICATIONS

| | | | |
|---|---|---|---|
| 378,757 | 7/1923 | Germany | 70/230 |

Primary Examiner—Richard J. Johnson
Attorney—Schapp & Hatch

[57] ABSTRACT

A security coupling is mounted in the wheel of a shopping cart. A pair of wheel retainers are secured together to prevent removal of the wheel from the frame of a shopping cart and include a pair of mating threaded connectors having enlarged heads carried in counterbores in the outer ends of the retainers such that only the outer faces of the connectors are accessible. To unscrew the connectors and disconnect the wheel from the frame a special wrench is provided having spaced tines which fit in corresponding lug sockets diametrically spaced across the ends of the connector heads. The connectors are releasably locked against rotation in the retainers by a spring key or spline. The key is sinuous shaped and in operative position is biased to project into confronting keyways on the connectors and retainers. One of the wrench tines is elongated to extend into the keyway and engage the slope of the spring key to retract it from its operative position so the connectors may be unscrewed with the wrench.

11 Claims, 8 Drawing Figures

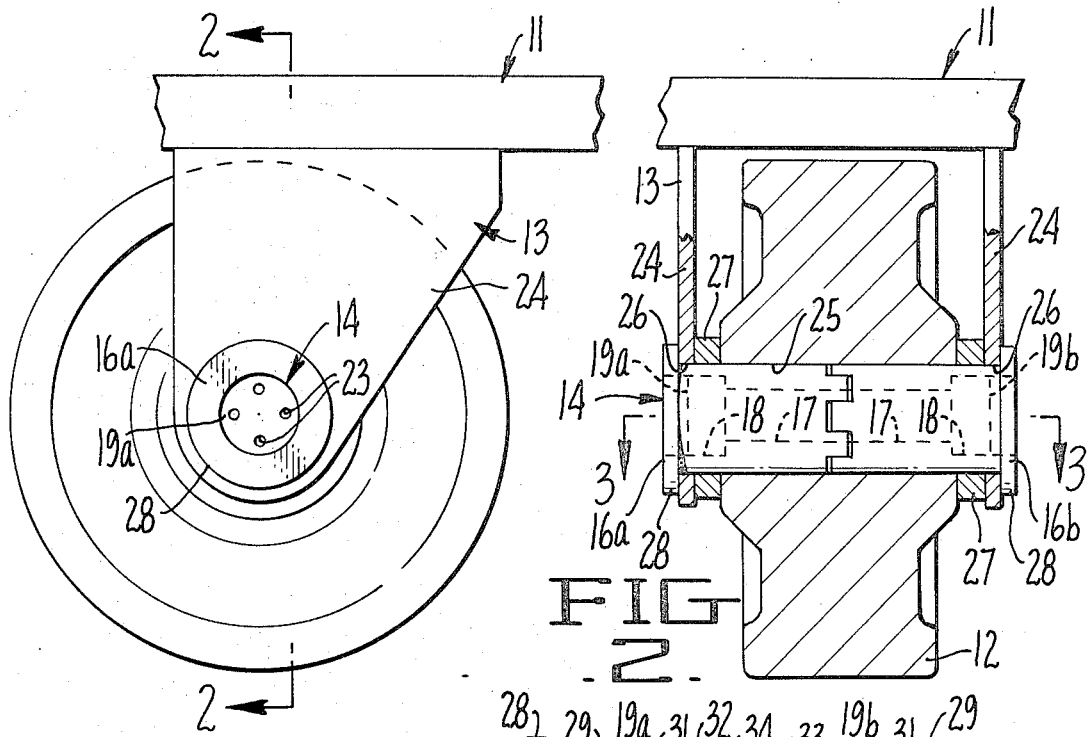
FIG. 1.
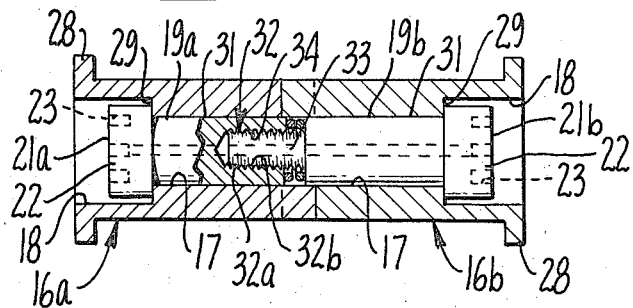
FIG. 2.
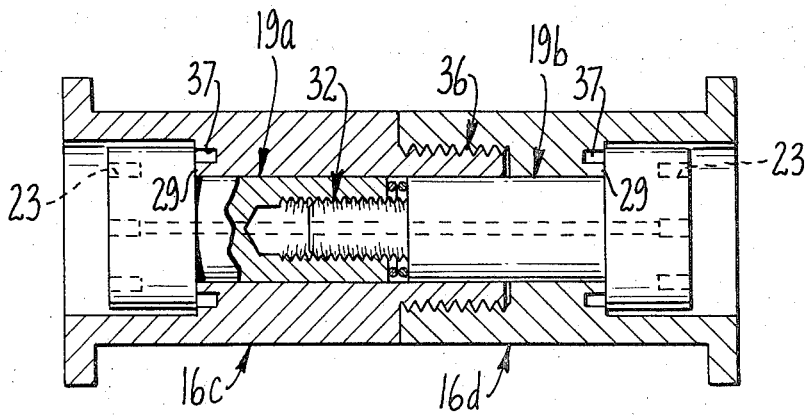
FIG. 3.
FIG. 4.
INVENTOR.
ROBERT M. SMITH
BY
Schapps & Hatch
ATTORNEYS

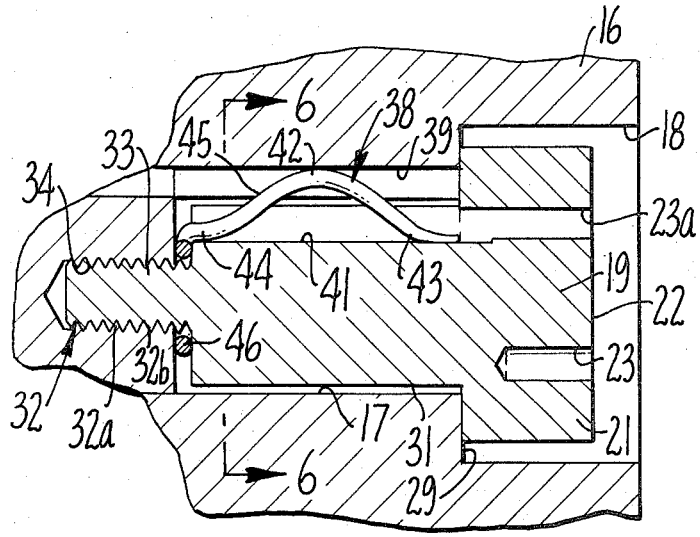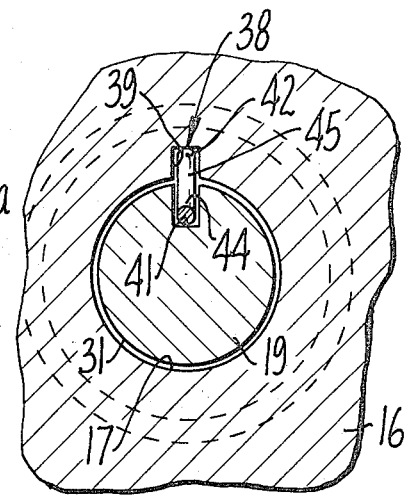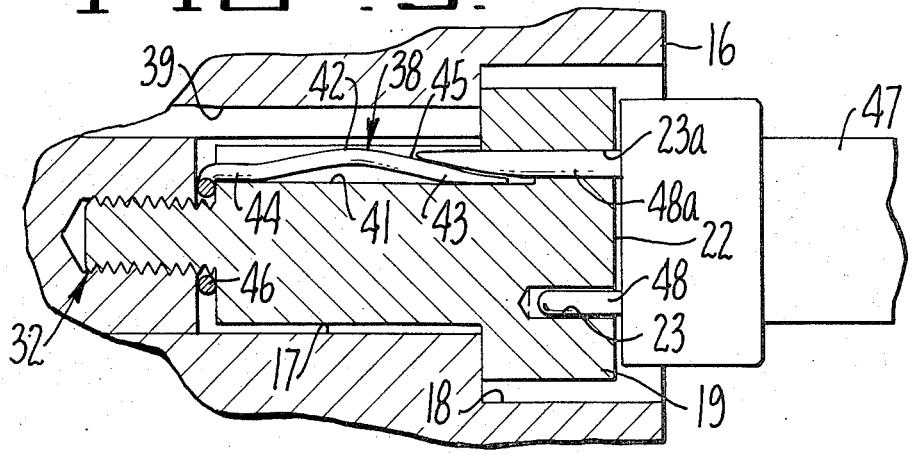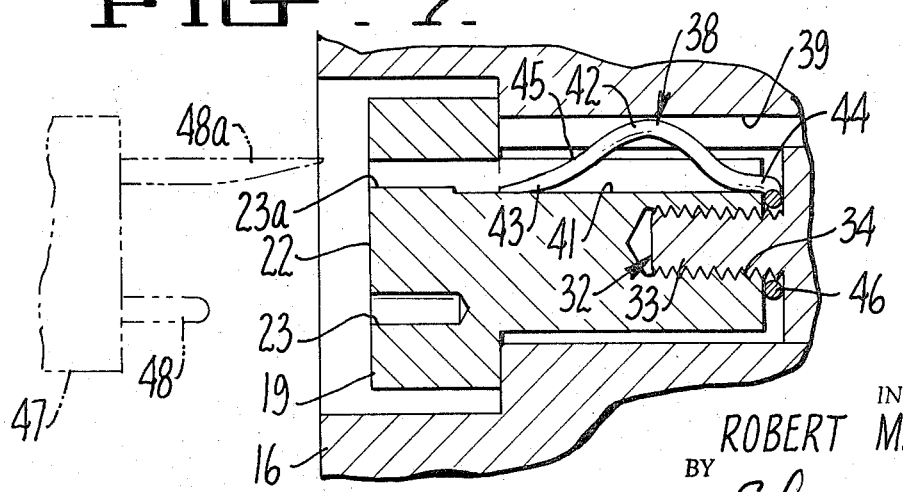

3,785,670

SECURITY COUPLING

Background of the Invention: This invention relates to a SECURITY COUPLING, and more particularly to an axle lock for use on shopping cart wheels and the like.

Vandals have presented an increasing problem to supermarket operators. With the advent of self-service shopping, the market has provided shopping carts for the use of their customers. Frequently these carts are removed from the store area and used for hauling purchased articles to a parking lot or the adjacent streets. Here they are abandoned for subsequent retrieval of the store personnel. Since these areas are unsupervised and the retrieval is only periodic, the unattended carts present an attraction to idle vandalism. Removal of the cart wheels has particularly become a problem. Since broken-down carts present a substantial investment and storage problem to the store operator it is desirous to provide a connection for the wheels which will provide a high degree of frustration to unauthorized removal and yet provide easy removal when servicing is required.

Generally, shopping carts have a series of depending frame members which support the wheels on horizontal axles. The axles may be carried directly on the frame members or may be mounted on swivel casters to allow the cart to be steered. In attaching the wheels to the frame members it is conventional to use a threaded rod, acting as the axle, and using end nuts to confine the rod between the frame members. The end nuts project beyond the frame members and may present faceted edges to facilitate easy turning by wrenches or pliers. Lock nuts have been used with the end nuts, mostly to prevent turning of the rod by the wheel, and these offer only marginal resistance to a determined vandal.

Summary of the Present Invention: The present invention provides an axle lock for preventing wheel removal in which the wheel is retained on the axle by retainers fastened in place by a security coupling. Threaded connectors hold the retainers in place and the connectors are releasably locked together to prevent relative turning and unscrewing. A retractable projection acts as a locking key and is spring biased into engagement with aligned grooves in both the turning and non-turning parts of the connector. Thus, even if a vandal should use a tool capable of gripping and turning the connectors, he must also be able to release and overcome the lock before the connector will turn.

It is therefore a principal object of the present invention to provide a device for connecting wheels to the frame of a shopping cart in such manner to make unauthorized removal so difficult as to discourage tampering.

It is another object of the invention to provide a self-locking connection of the character described which requires a special tool for unlocking and removal.

It is still another object to provide such a device which may be incorporated on existing carts and which does not give a clue to the casual observer as to how the lock may be overcome, and which will automatically relock if the locking device is surreptitiously overcome.

Yet another object is to provide such a locking connection which may be used on either the male or female portions of the connector, or both, such that the connection may be unscrewed with the proper tool from either, or both, ends of the connector in a rapid and simple manner.

Still another object is to provide a security coupling for screwed connections of the character set forth which is simple and economical to fabricate, and is simple and reliable in operation.

BRIEF DESCRIPTION OF THE DRAWINGS:

The preferred forms of the invention are illustrated in the accompanying drawings, forming a part of this specification, in which:

FIG. 1 is a partial elevational view of a shopping cart wheel structure incorporating a security coupling made in accordance with the present invention;

FIG. 2 is an elevational sectional view taken substantially along the plane of line 2—2 of FIG. 1;

FIG. 3 is a sectional view taken substantially along the plane of line 3—3 of FIG. 2;

FIG. 4 is a view similar to FIG. 3 but on an enlarged scale and illustrating an alternate embodiment of the present invention;

FIG. 5 is an enlarged fragmentary sectional view of a self-locking connection made in accordance with the present invention and shown in its locked condition;

FIG. 6 is a section taken substantially along the plane of line 6—6 of FIG. 5;

FIG. 7 is a view similar to FIG. 5 but wherein the self-locking connection is in its unlocked condition; and FIG. 8 is a sectional view similar to FIG. 5 but with the self-locking connection located on the female portion of the connector.

Description of the Preferred Embodiment: Looking to the drawings, there is shown a shopping cart 11 having a wheel 12 journalled to the frame 13 by a security lock axle 14. The security axle 14 includes a pair of cylindrical retainer members 16 formed for securing and supporting the wheel 12 on the frame 13 in a manner discouraging unauthorized removal.

As here shown, the retainers 16 each have a bore 17 therethrough with enlarged counterbores 18 at the outer ends thereof. A mating pair of threaded connectors 19a and 19b are formed to secure the respective retainer members 16a and 16b to the frame 13. Connectors 19a, 19b have enlarged heads 21a and 21b carried in the counterbores 18 in such manner that only the outer faces 22 of the heads are accessible. These faces or ends 22 have spaced wrench sockets 23 by means of which the connector members 19 may be turned.

As shown in FIG. 1 and 2 a typical shopping cart provides a pair of depending frame members 24 having aligned bores 26 for receiving the axle. Generally, a conventional type of axle used for shopping carts consists of a rod having a threaded connection for a nut at one end and an upset head at its other end to hold the wheel in proper position. Spacer washers 27 may be included to reduce friction.

The security axle of the present invention replaces the conventional axles without extensively reworking of the frame or wheel. Here, each of the retainer members 16 is similar to the other and is cylindrically shaped, with an outside diameter corresponding with the bores 26 in the frame and the central bore 25 of the wheel. the outer ends of the retainers 16a, 16b include enlarged flanges 28 which abut the frame members 24, while the inner ends are castellated or otherwise keyed together to prevent the retainers from turning relative to one another. The interior bore 17 and the counterbores 18 of the retainers form an interior shoulder 29 against which the enlarged heads 21 of the connectors bear to hold the retainers 16a and 16b together.

The connector members 19a and 19b are similarly cylindrical and are stepped longitudinally, with reduced diameters from an enlarged head portions 21a and 21b, corresponding to the retainer counterbores 18, to a smaller diameter portion 31 corresponding to retainer bores 17. The connector members 19a and 19b terminate at their inner ends in a treaded connection 32. Enlarged head 21 is made somewhat shorter than the depth of the counterbore 18 so that only the end face of the connector head is accessible. This prevents pliers or other similar tools gaining a purchase on the connector. Similarly, because the retainers 16a, 16b are keyed together, the connectors 19a, 19b will not unscrew because of turning of the flanges 28 or the wheel 12.

The threaded connections 32 are defined by mating male and female threads 32a and 32b on stud 33 and bore 34. The threaded portions are rotated or turned relative to each other by wrench sockets or gripping areas 23 provided in the ends of each head 21a and 21b. The wrench sockets 23 are in the form of longitudinal bores diametrically spaced across the ends of the heads 21 and preferably have a spacing or configuration that is not standard so that only a specially made tool will fit them.

As shown in FIG. 4, an alternate embodiment of the invention provides a retainer means which includes a threaded connection 36 between the retainer members 16c and 16d. Wrench sockets 37 are provided in the shoulders 29 and are spaced differently than the connector wrench sockets 23 so that a different wrench must be used to disconnect them. Similarly the threads 36 are of a different handedness or pitch so they will not unscrew with the connectors 19 and hence cannot be unscrewed until the connectors are removed. This increases the security of the axle lock.

An an important feature of the present invention, a releasable key 38 interengages between the retainer and connector members to prevent relative turning and unscrewing of the members until the key is depressed by a special tool. This key 38 is spring biased to project into opposed longitudinal keyways 39 and 41 whenever the keyways are in confronting relation. Keyway 39 is carried in bore 18 of retainer 16 and keyway 41 is carried on the elongated portion 31 of connector 19. Key 38 here is made from spring stock and is bent into a curvilinear shape having a central arched portion 42 and flattened end portions 43 and 44.

End portions 43 and 44 lie in keyway 41 while the arched portion 43 is resiliently biased into keyway 39. The key will thus tend to snap into the confronting keyways each time they are aligned. Thus, if the key 39 is ever once surreptitiously overcome it will reset itself after only one revolution of the screw connection and will tend to frustrate any idle tampering therewith.

Preferably, the end of the key is turned inwardly in the shape of a ring 46 which encircles and is carried on the stud portion 33 to properly position the key longitudinally of the connector with the end portions in keyway 41. The key 38 can similarly be carried on the female portion of connector 19a and the ring fit around the entering male stub.

To release the key 38 and unscrew the connectors, a single tool 47 is used. One of the wrench sockets, or bores, 23a is aligned with and intersects keyway 41 to give access to the sloping end portion 45 of the spring key 38. A lug wrench 47 having tines 48 spaced correspondingly to the bores 23 is provided for releasing the lock and has one of the tines 48a extended or elongated to fit within keyway 41. When tool 47 is inserted into the bores, tine 48a projects into keyway 41 intercepting key 38 to deflect and depress the key from keyway 39 entirely into keyway 41, thus retracting the key from its operative position (see FIG. 7).

With the wrench 47 thus positioned in sockets 23 and the key 38 retracted, the wrench is rotated to unscrew the connectors 19. Similarly, the tool must be used in order to tighten the connection. Because of its obvious simplicity and reliability, this device may be used on other connector configurations other than shopping cart axles where it is desirable to prevent removal of a shaft or pivot member, such as in hinge pins and the like.

From the foregoing it will be seen that the security lock for axles and the like of the present invention effectively prevents the connectors from being unscrewed, by providing limited access to the connector heads and locking the connectors from turning with a releasable key and special tool for simultaneously releasing the key and unscrewing the connectors.

I claim:

1. In a shopping cart having wheels journalled to a frame a security axle, comprising
   a pair of cylindrical retainer members formed for securing and rotatably supporting a wheel on the frame, said retainers being formed with an axially extending bore and enlarged counterbores at the outer ends of said bore,
   a pair of threadably engaged connector members extending through said bore and formed for securing the retainer members to the frame,
   said connector members having enlarged heads carried in the counterbores such that only the outer faces of the heads are accessible, and
   spaced sockets formed in the outer faces of the connector heads for effecting relative rotation and unscrewing of said connector members from each other.

2. An apparatus as described in claim 1 and wherein said bore and each of said counterbores define an interior shoulder therebetween, and said enlarged head abuts said interior shoulder and is adapted to draw the retainers together and to conceal the threaded portion of said connectors when the latter are screwed together.

3. An apparatus as defined in claim 1 and wherein said connector members have an enlarged cylindrical body portion slidable in said bore, and said threaded connection is defined by male and female threaded portions contained within said enlarged cylindrical body portion.

4. In a shopping cart having wheels journalled to a frame member, a security coupling comprising
   a pair of mating retainer members having a threaded connection therebetween and formed for securing and supporting a wheel on the frame,
   each of said retainer members having a stepped bore therein defining an interior shoulder, spaced wrench sockets in said shoulder for turning the threaded retainer members relative to one another, a pair of mating cylindrical connector members having a threaded connection therebetween and formed to be carried in said bore, said connector members each having an enlarged head formed to abut one of said shoulders and overlie said spaced wrench sockets therein, said head being carried in said bore such that only the outer face thereof is accessible, said retainer members having spaced wrench sockets in the outer faces of said head for turning said retainer members, said wrench sockets and said threaded connection of the connector member having a different configuration than the wrench sockets and threads of the retainer member.

5. An apparatus as described in claim 1 and having releasable locking means carried between said retainer member and said connector member to prevent relative turning therebetween when said locking means is in an operative position.

6. An apparatus as described in claim 5 and wherein said locking means is biased into said operative position and is selectively retractable therefrom.

7. An apparatus as described in claim 5 and wherein said locking means includes releasable key means carried between the retainer members and connector members and biased into joint engagement therewith to prevent relative turning therebetween when said key means is engaged.

8. An apparatus as described in claim 7 and further comprising tool means formed to release the key from said joint engagement and turn said connector member while said key is released.

9. An apparatus as described in claim 7 and wherein corresponding retainer members and connector members have con-fronting keyways formed therein for receiving a retractable key to prevent relative turning therebetween, and said retainer members include means to prevent relative turning between said retainer members when said connector members are securing said retainer members to the frame.

10. In a shopping cart having a wheel journalled to a frame, a security axle comprising
   a threaded member adapted for threaded operative connection to secure the axle within the frame for connecting the wheel to the frame,
   a releasable key adapted for connection to the axle and positioned to engage said threaded member and prevent turning thereof relative to the axle.
   means to intercept said releasable key and deflect it from its engaged position, said means being adapted for simultaneously turning said threaded member.

11. In a shopping cart having a wheel journalled to a frame, a security axle comprising
   a first member formed for supporting a wheel,
   said member having a bore therethrough,
   a second member carried in the bore of said first member and formed to secure the wheel to the frame through a threaded connection,
   a releasable key carried in said bore and spring biased into opposed keyways on said first and second members and adapted to prevent relative turning of said members when said keyways are in confronting relation,
   a longitudinal access opening intersecting said key, and
   a tool formed to enter said opening and deflect said key from one of the keyways whereby the threaded connection may be turned to release the wheel from the frame.

* * * * *